(12) United States Patent
Mathew et al.

(10) Patent No.: US 8,345,373 B2
(45) Date of Patent: Jan. 1, 2013

(54) SYSTEMS AND METHODS FOR PHASE OFFSET BASED SPECTRAL ALIASING COMPENSATION

(75) Inventors: George Mathew, San Jose, CA (US); Yuan Xing Lee, San Jose, CA (US); Hongwei Song, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 15 days.

(21) Appl. No.: 12/856,782

(22) Filed: Aug. 16, 2010

(65) Prior Publication Data
US 2012/0038998 A1 Feb. 16, 2012

(51) Int. Cl.
*G11B 5/09* (2006.01)
*G11B 5/00* (2006.01)
*G11B 21/02* (2006.01)

(52) U.S. Cl. ............... 360/75; 360/32; 360/51

(58) Field of Classification Search .................. None
See application file for complete search history.

(56) References Cited

U.S. PATENT DOCUMENTS

| | | | |
|---|---|---|---|
| 4,715,257 A | 12/1987 | Hiroyki et al. | |
| 4,777,544 A | 10/1988 | Brown et al. | |
| 5,086,475 A | 2/1992 | Kageyama et al. | |
| 5,111,727 A | 5/1992 | Rossum | |
| 5,377,058 A | 12/1994 | Good et al. | |
| 5,814,750 A | 9/1998 | Read et al. | |
| 6,519,102 B1 | 2/2003 | Smith et al. | |
| 6,707,772 B1 * | 3/2004 | Marrec et al. | 369/44.34 |
| 6,937,424 B2 | 8/2005 | Chang et al. | |
| 7,038,875 B2 | 5/2006 | Lou et al. | |
| 7,158,325 B1 | 1/2007 | Hu et al. | |
| 2005/0024761 A1 * | 2/2005 | Lou et al. | 360/75 |
| 2005/0046982 A1 | 3/2005 | Liu et al. | |
| 2007/0268615 A1 | 11/2007 | McFadyen et al. | |
| 2008/0018786 A1 | 1/2008 | Kageyama et al. | |
| 2009/0195916 A1 * | 8/2009 | Chauhan et al. | 360/77.06 |
| 2009/0299666 A1 | 12/2009 | Kang et al. | |
| 2009/0323211 A1 * | 12/2009 | Tang et al. | 360/31 |
| 2011/0249361 A1 * | 10/2011 | Mathew et al. | 360/75 |

FOREIGN PATENT DOCUMENTS

| | | |
|---|---|---|
| WO | WO 02/093546 | 11/2002 |
| WO | 2008-071367 | 7/2008 |
| WO | WO 2010/014078 | 2/2010 |

OTHER PUBLICATIONS

U.S. Appl. No. 12/851,425, filed Aug. 5, 2010, Mathew et al.
U.S. Appl. No. 12/851,455, filed Aug. 5, 2010, Mathew et al.
U.S. Appl. No. 12/875,734, Sep. 3, 2010, Mathew et al.

(Continued)

*Primary Examiner* — Regina N Holder
(74) *Attorney, Agent, or Firm* — Hamilton DeSanctis & Cha (57) ABSTRACT

Various embodiments of the present invention provide systems and methods for phase offset based spectral aliasing compensation. For example, a circuit for spectral aliasing reduction is disclosed that includes a phase shift circuit operable to phase shift an analog input signal and to provide a phase shifted analog signal; a first analog to digital converter circuit operable to provide a first series of digital samples corresponding to the analog input signal at a sampling frequency; a second analog to digital converter circuit operable to provide a second series of digital samples corresponding to the phase shifted analog signal at the sampling frequency; and an averaging circuit operable to average the first series of digital samples with the second series of digital samples to yield an average output.

30 Claims, 5 Drawing Sheets

OTHER PUBLICATIONS

Fertner, A. "Frequency-Domain Echo Canceller With Phase Adjustment" IEEE Trans. on circuits and Systems-II; Analog and Digital Signal Processing, vol. 44, No. 10, Oct. 1997.

Liu, et al., "Head Disk Spacing Variation Suppression via Active Flying Height Control" IEEE Instrumentation and Measurement Technology Conf. Budapest, Hungary May 21-23, 2001.

U.S. Appl. No. 12/669,483, filed Aug. 12, 2010, Graef, Nils.

U.S. Appl. No. 12/875,734, filed Sep. 3, 2010, Mathew et al.

Fertner, Antoni "Frequency-Domain Echo Canceller With Phase Adjustment" IEEE Transactions on circuits and Systems-II; Analog and Digital Signal Processing, V. 44, No. 10, Oct. 1997.

* cited by examiner

SYSTEMS AND METHODS FOR PHASE OFFSET BASED SPECTRAL ALIASING COMPENSATION

BACKGROUND OF THE INVENTION

The present inventions are related to systems and methods for transferring information to and from a storage medium, and more particularly to systems and methods for positioning a sensor in relation to a storage medium.

Various electronic storage media are accessed through use of a read/write head assembly that is positioned in relation to the storage medium. The read/write head assembly is supported by a head actuator, and is operable to read information from the storage medium and to write information to the storage medium. The distance between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature crash of the storage device.

In a typical storage device, fly height is set to operate in a predetermined range. During operation, the fly height is periodically measured to assure that it continues to operate in the predetermined region. A variety of approaches for measuring fly height have been developed including optical interference, spectrum analysis of a read signal waveform, and measuring a pulse width value of the read signal. Such approaches in general provide a reasonable estimate of fly height, however, they are susceptible to various errors. Such errors require that the predetermined operating range of the fly height be maintained sufficiently large to account for the various errors. This may result in setting the fly height such that inter symbol interference is too high.

Hence, for at least the aforementioned reasons, there exists a need in the art for advanced systems and methods for positioning a sensor in relation to a storage medium.

BRIEF SUMMARY OF THE INVENTION

The present inventions are related to systems and methods for transferring information to and from a storage medium, and more particularly to systems and methods for positioning a sensor in relation to a storage medium.

Various embodiments of the present invention provide circuits for spectral aliasing reduction. Such circuits include a phase shift circuit operable to phase shift an analog input signal and to provide a phase shifted analog signal; a first analog to digital converter circuit operable to provide a first series of digital samples corresponding to the analog input signal at a sampling frequency; a second analog to digital converter circuit operable to provide a second series of digital samples corresponding to the phase shifted analog signal at the sampling frequency; and an averaging circuit operable to average the first series of digital samples with the second series of digital samples to yield an average output.

In some instances of the aforementioned embodiments, an amount of phase shift applied by the phase shift circuit is calculated to mitigate spectral aliasing at a specific frequency in the output of the averaging circuit. Such mitigation may be less than full elimination of spectral aliasing all the way to full elimination of spectral aliasing. In some such instances, the amount of phase shift is pre-determined for a particular frequency in accordance with the following equation:

$$\rho = \frac{1}{2[k_0 f_0 - 1/T]}.$$

where $k_0 f_0$ denotes the harmonic frequency at which aliasing needs to be cancelled and T denotes the sampling period.

In various instances of the aforementioned embodiments, the averaging circuit adds the first series of digital samples to the second series of digital samples. This may be on a sample by sample basis. In some cases, the circuit further comprises a harmonic sensing circuit operable to divide a first harmonic of the average output by a second harmonic of the average output to yield a harmonic ratio. In some such cases, the harmonic ratio is provided to a fly height calculation circuit. In various cases, the first harmonic corresponds to one eighth of the sampling frequency, and the second harmonic corresponds to three eighths of the sampling frequency.

Other embodiments of the present invention provide methods for mitigating spectral aliasing at, for example, a chosen frequency. Such methods include receiving an analog input signal; phase shifting the analog input signal to yield a phase shifted analog signal; performing an analog to digital conversion on the phase shifted analog signal at a sampling frequency to yield a first series of digital samples; performing an analog to digital conversion on the analog input signal at the sampling frequency to yield a second series of digital samples; and averaging the first series of digital samples and the second series of digital samples to yield an average value. Among other things, various embodiments of the present invention provide for mitigating spectral aliasing in the case of periodic as well as non-periodic signals. Based upon the disclosure provided herein, one of ordinary skill in the art will recognize other advantages either in place of or in addition to the aforementioned that may be achieved though implementation of one or more embodiments of the present invention.

Yet other embodiments of the present invention provide storage systems that include a storage medium; a read/write head assembly disposed a fly height from the storage medium and operable to sense information maintained on the storage medium and to provide an analog input signal corresponding to the sensed information; a read channel circuit; and a fly height adjustment circuit. The read channel circuit includes: a phase shift circuit operable to phase shift the analog input signal and to provide a phase shifted analog signal; a first analog to digital converter circuit operable to provide a first series of digital samples corresponding to the analog input signal at a sampling frequency; a second analog to digital converter circuit operable to provide a second series of digital samples corresponding to the phase shifted analog signal at the sampling frequency; an averaging circuit operable to average the first series of digital samples with the second series of digital samples to yield an average output; and a harmonic sensing circuit operable to divide a first harmonic of the average output by a second harmonic of the average output to yield a harmonic ratio. The fly height adjustment circuit is operable to receive the harmonic ratio and to adjust the fly height based upon the harmonic ratio.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4b is a cross sectional view showing the relationship between the disk platter and the read/write head assembly of the storage device of FIG. 4a.

DETAILED DESCRIPTION OF THE INVENTION

The present inventions are related to systems and methods for transferring information to and from a storage medium, and more particularly to systems and methods for positioning a sensor in relation to a storage medium.

Figure 1A:
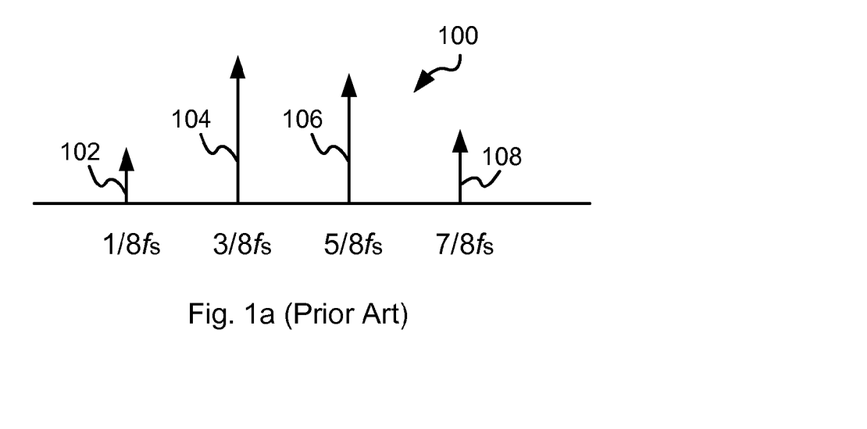
FIG. 1a shows the spectrum of an analog periodic signal of period 8/fs, containing only four non-zero harmonics.
Figure 1B:
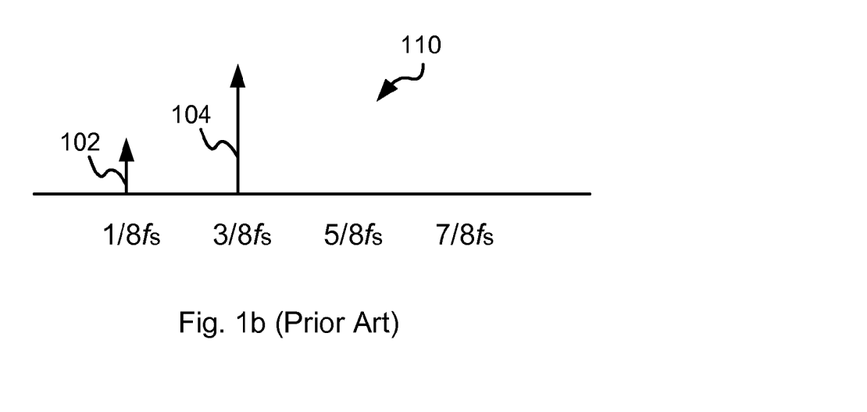
FIG. 1b shows the spectrum of the analog signal in FIG. 1a low pass filtered using an ideal filter that removes all components at frequencies beyond a defined threshold fs/2.
Figure 1C:
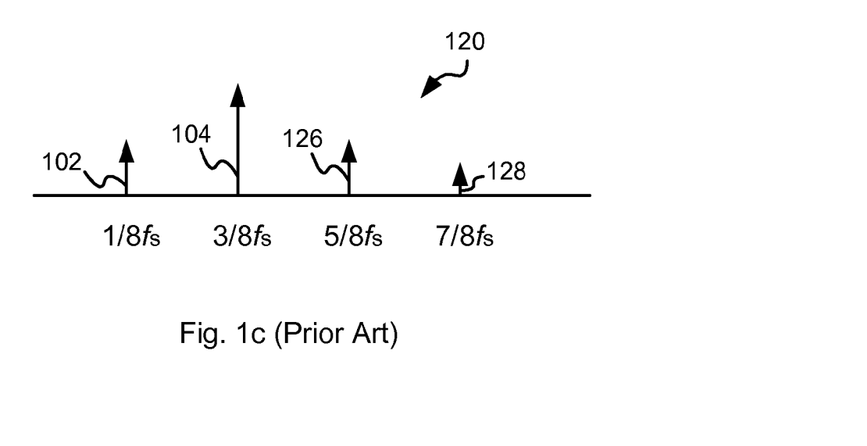
FIG. 1c shows the spectrum of the analog signal in FIG. 1a low pass filtered using a non-ideal filter that attenuates the frequencies beyond a defined threshold fs/2.
Figure 1D:
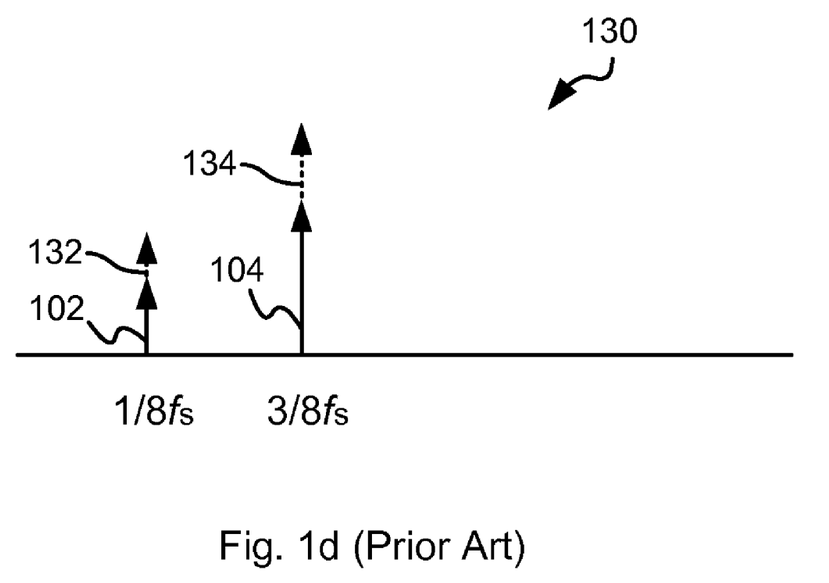
FIG. 1d shows the spectrum of the analog signal in FIG. 1a low pass filtered using a non-ideal filter that attenuates the frequencies beyond the defined threshold fs/2, and sampled at a sampling frequency (fs)

Turning to FIG. 1a, an exemplary spectrum 100 of an analog periodic signal of period 8/fs, where fs is the fundamental frequency, is shown. As shown in this example, there are signal components at four different frequency points (i.e., a fs/8 point 102, a 3fs/8 point 104, a 5fs/8 point 106, and a 7 fs/8 point 108). In contrast, FIG. 1b shows an exemplary spectrum 110 where the analog signal in FIG. 1a is low pass filtered using an ideal filter such that the all of the frequency components above fs/2 are removed. As shown, the signal components corresponding to the lower frequency points (i.e., fs/8 point 102 and 3fs/8 point 104) remain, while the signal components corresponding to the higher frequency points (i.e., 5fs/8 point 106 and 7fs/8 point 108) are eliminated. FIG. 1c shows an exemplary spectrum 120 where the analog signal in FIG. 1a is low pass filtered using a non-ideal filter. Due to the non-ideal nature of the filter, some level of the higher frequency components (i.e., a 5fs/8 point 126 and a 7fs/8 point 128) remain, but are attenuated when compared with those shown in FIG. 1a. FIG. 1d shows an exemplary spectrum 130 where the analog signal at the output of the non-ideal low-pass filter in FIG. 1c is sampled at a sampling frequency fs. Only the frequency components in the primary bandwidth (i.e., fs/8 point 102 and 3fs/8 point 104) are shown in FIG. 1d. As shown, the higher frequency components at frequencies 5fs/8 and 7fs/8 are folded back onto the corresponding low frequency components at frequencies 3fs/8 and fs/8, respectively. This is represented by a signal of a magnitude corresponding to 5fs/8 point 126 (i.e., a component 134) added to 3fs/8 point 104, and a signal of a magnitude corresponding to 7fs/8 point 128 (i.e., a component 132) added to fs/8 point 102. Of note, components 132, 134 can be either positive or negative depending upon their phase. Component 132 and component 134 are referred to herein as spectral aliasing components.

In practice, spectral aliasing can corrupt a number of sensitive measurements such as, for example, fly height measurement. Various embodiments of the present invention provide circuits and methods for reducing or eliminating spectral aliasing. The signal from which the spectral aliasing is removed may then be used, for example, to accurately determine the fly height of a read/write head assembly relative to a storage medium. In some cases, the spectral aliasing is cancelled by averaging two sequences of digital samples derived from an analog to digital converter are constructed in such a way that the aliasing component in one sequence is negative of that in the other sequence. This phase reversal of aliasing components is accomplished by phase-shifting one waveform (before sampling) by an amount that depends on the frequency at which aliasing should be cancelled. For a given frequency, the required phase-shift can be computed analytically. Such approaches may be used in conjunction with various different harmonic sensing based approaches to fly height calculation, but application of the harmonic calculation approaches is not limited to calculation of fly height in relation to disk drives.

As just some advantages, various embodiments of the present invention facilitate the use of higher harmonic frequencies allowing for increased sensitivity and resolution capability in a fly height control system. Without the present invention, higher frequency harmonics will not be suitable for fly height application because of spectral aliasing. As another example, some embodiments of the present invention allow for the use of an analog front end circuit including an analog circuit that exhibits a slow roll off rather than a sharp frequency response. A filter with such a slow roll off may often be implemented with relatively simple circuitry requiring lower power and semiconductor area. Again, without the present invention, use of analog front-end circuits with sharp roll-off becomes necessary to minimize aliasing. Further, one or more embodiments of the present invention approaches for reducing spectral aliasing described herein can be employed in relation to a variety of different existing harmonics sensor circuitry. Based upon the disclosure provided herein, one of ordinary skill in the art will recognize a variety of other advantages that may be had in accordance with different embodiments of the present invention.

Figure 2:
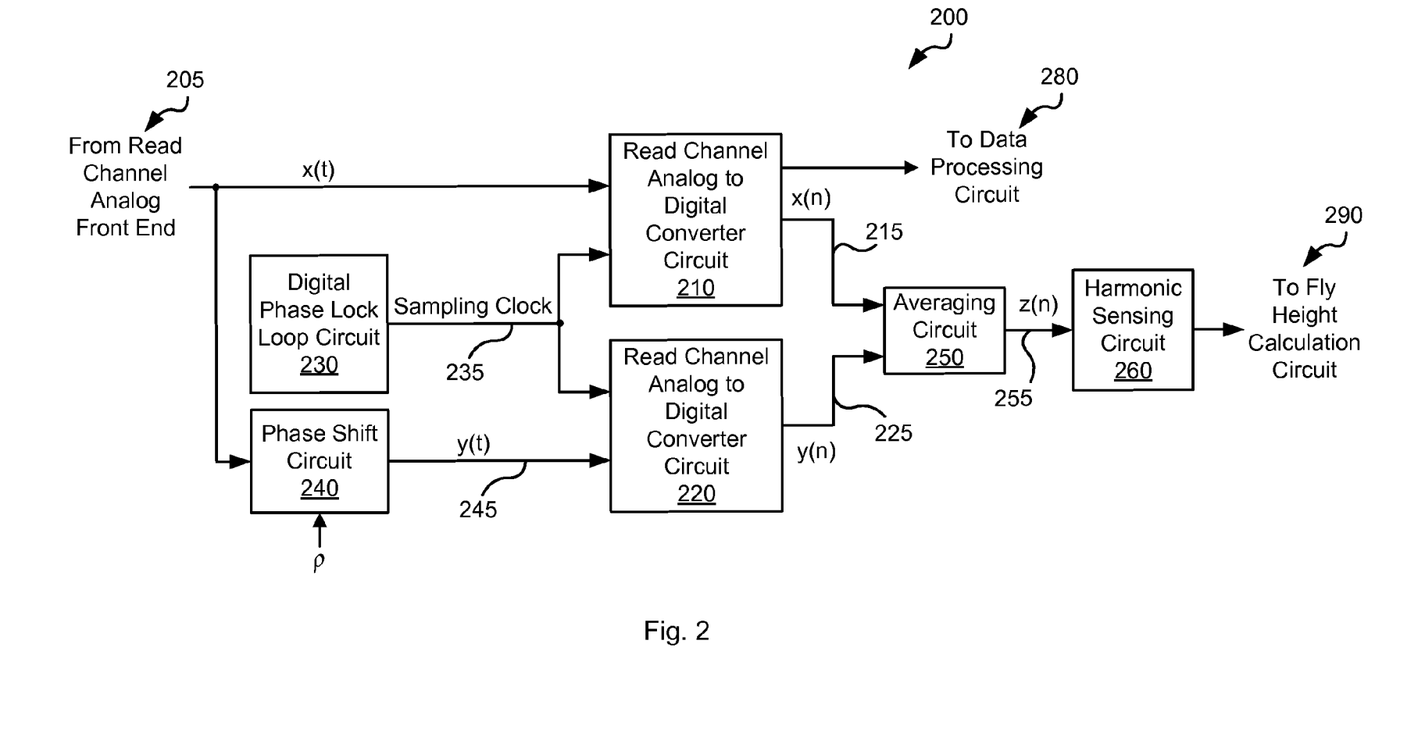
FIG. 2 depicts a phase offset based spectral aliasing compensation circuit in accordance with one or more embodiments of the present invention.

Turning to FIG. 2, a phase offset based spectral aliasing compensation circuit 200 is shown in accordance with one or more embodiments of the present invention. Compensation circuit 200 includes a digital phase lock loop circuit 230 that provides a sampling clock 235 to synchronize sampling operations. Digital phase lock loop circuit 230 may be any digital phase lock loop circuit known in the art, or may be replaced by any circuit known in the art that is capable of generating a clock corresponding to an input signal stream.

Compensation circuit 200 further includes a read channel analog to digital converter circuit 210 that receives an analog periodic input signal 205 (x(t)) from an analog front end circuit (not shown). Analog input signal 205 is converted to a series of digital samples 215 (x[n]) at a sample frequency (fs=1/T) provided by sampling clock 235. There are invariably higher harmonics in the analog input signal 205 that exceed 1/(2T)=fs/2. These higher harmonics result in spectral aliasing where the analog front end circuit does not attenuate them significantly.

The series of digital samples is also provided to a downstream data processing circuit 280. The data processing circuit may be any circuit known in the art that performs some level of data processing of the received series of digital samples. For example, where compensation circuit 200 is implemented as part of a storage system, the data processing circuit may include one or more data detector circuits and one or more data decoder circuits to perform the data processing. The data detector circuits may be, for example, maximum a posteriori detector circuits as are known in the art, and the data decoder circuits may be, for example, low density parity check decoder circuits as are known in the art. Based upon the disclosure provided herein, one of ordinary skill in the art will recognize a variety of data processing circuits 280 that may be utilized in relation to different embodiments of the present invention.

Compensation circuit 200 also includes a phase shift circuit 240 that phase shifts analog input signal 205 to yield a phase shifted analog signal 245 (y(t)) represented by the following equation:

$$y(t) = x(t+\rho),$$

where ρ is the phase offset added by phase shift circuit 240. Phase shifted analog signal 245 is provided to a read channel analog to digital converter circuit 220 that converts the signal into a series of digital samples 225 (y[n]) at a sample frequency (1/T) provided by sampling clock 235.

Digital samples 215 and digital samples 225 are provided to an averaging circuit 250 that adds the series of digital samples 225 to the series of digital samples 215 on a sample by sample basis in accordance with the following equation:

$$z[n] = \frac{x[n] + y[n]}{2}.$$

In some embodiments the aforementioned division by two is done to yield a true average, while in other embodiments only the addition is performed as a ratio is later performed that compensates for not dividing by two.

The aforementioned average value 255 is provided to a harmonic sensing circuit 260 that performs a discrete Fourier transform of the received average value at two harmonic frequencies represented in the received average. In one particular embodiment of the present invention, the periodic analog signal x(t) has period 8T (i.e. period=8/fs), the first harmonic frequency is one eighth of the sampling frequency used by both digital converter circuit 210 and digital converter circuit 220, and the second harmonic frequency is three eighths of the sampling frequency. Based upon the disclosure provided herein, one of ordinary skill in the art will recognize other combinations of harmonic frequencies that may be used in relation to different embodiments of the present invention. Harmonic sensing circuit 260 provides a ratio of the discrete Fourier transform of average value 255 at the first frequency and the discrete Fourier transform of average value 255 at the second frequency.

The spectrum (discrete Fourier transform) of sampled sequence x[n]=x(nT+τ) is represented by the following equation where 1/T is the sampling rate used in synchronous sampling of x(t):

$$Xd(f) = \frac{\exp(2j\pi f \tau)}{T} Xa(f) + \frac{\exp(2j\pi [f - 1/T]\tau)}{T} Xa(f - 1/T),$$

$$\text{for } 0 \le f \le \frac{1}{2T}.$$

The first portion of the aforementioned equation $$\left(\text{i.e., } \frac{\exp(2j\pi f \tau)}{T} Xa(f)\right)$$

represents the desired spectrum, and the second portion $$\left(\text{i.e., } \frac{\exp(2j\pi [f - 1/T]\tau)}{T} Xa(f - 1/T)\right)$$

represents the undesired spectral aliasing portion. Xd(f) represents the Fourier transform of x[n] and Xa(f) represents the Fourier transform of x(t). Further, it is assumed that Xa(f) is equal to zero for frequencies beyond |f|=1/T.

Similarly, the spectrum (discrete Fourier transform) of sampled sequence y[n]=y(nT+τ+ρ) is represented by the following equation where 1/T is the sampling rate used in synchronous sampling of y(t):

$$Yd(f) =$$

$$\frac{\exp(2j\pi f[\tau + \rho])}{T} Xa(f) + \frac{\exp(2j\pi [f - 1/T][\tau + \rho])}{T} Xa(f - 1/T),$$

$$\text{for } 0 \le f \le \frac{1}{2T}.$$

The first portion of the aforementioned equation $$\left(\text{i.e., } \frac{\exp(2j\pi f[\tau + \rho])}{T} Xa(f)\right)$$

represents the desired spectrum, and the second portion $$\left(\text{i.e., } \frac{\exp(2j\pi [f - 1/T][\tau + \rho])}{T} Xa(f - 1/T)\right)$$

represents the undesired spectral aliasing portion. Yd(f) represents the Fourier transform of y[n].

The spectrum of average value 255 (z[n]) is defined by the following equation:

$$Zd(f) = \frac{Xd(f) + Yd(f)}{2}.$$

In order to eliminate the undesired spectral aliasing portions at a given harmonic frequency $k_0 f_0$ where $f_0$ is the fundamental frequency of the periodic signal x(t) and $k_0$ is an integer denoting the harmonic index, ρ is selected such that $$\frac{\exp(2j\pi[k_0 f_0 - 1/T][\tau + \rho])}{T} Xa(k_0 f_0 - 1/T)$$

is the negative of $$\frac{\exp(2j\pi[k_0 f_0 - 1/T]\tau)}{T} Xa(k_0 f_0 - 1/T).$$

To do this, $\rho$ is selected such that:

$$\exp(2j\pi[k_0 f_0 - 1/T]\rho) = -1; \text{ or}$$

$$\rho = \frac{m}{2[k_0 f_0 - 1/T]}$$

where m is an odd integer.

Without loss of generality, we choose m=1. Of note, the phase $\rho$ is independent of the unknown sampling phase $\tau$ yielded by digital phase lock loop circuit 230. It is assumed that x[n] does not suffer from aliasing at frequency fo. Where $\rho$ is set as described above, the spectra of the average yielded by averaging circuit 250 at the harmonic frequencies $f_0$ and $k_0 f_0$ are set forth in the following equations:

$$Zd(f_0) = \left[\frac{\exp(2j\pi f_0 \tau) + \exp(2j\pi f_0 [\tau + \rho])}{2T}\right] Xa(f_0),$$

$$Zd(k_0 f_0) = \left[\frac{\exp(2j\pi k_0 f_0 \tau) + \exp(2j\pi k_0 f_0 [\tau + \rho])}{2T}\right] Xa(k_0 f_0).$$

The harmonic ratio of the discrete Fourier transform of average value 255 at the first frequency $f_{o1} = f_0$ and the discrete Fourier transform of average value 255 at the second frequency $f_{o2} = k_0 f_0$ is described by the following equations:

$$\text{harmonic ratio} = \frac{\left[\frac{\exp(2j\pi f_{o1} \tau) + \exp(2j\pi f_{o1}[\tau + \rho])}{2T}\right] \cdot Xa(f_{o1})}{\left[\frac{\exp(2j\pi f_{o2} \tau) + \exp(2j\pi f_{o2}[\tau + \rho])}{2T}\right] \cdot Xa(f_{o2})},$$

or $$|\text{harmonic ratio}| = \left|\frac{1 + \exp(2\pi j f_{o1} \rho)}{1 + \exp(2\pi j f_{o2} \rho)}\right| \cdot \left|\frac{Xa(f_{o1})}{Xa(f_{o2})}\right|.$$

The ratio $$\left|\frac{1 + \exp(2\pi j f_{o1} \rho)}{1 + \exp(2\pi j f_{o2} \rho)}\right|$$

is a known constant. Thus, the harmonic ratio may be reduced to the following equation:

$$|\text{harmonic ratio}| = K \left|\frac{Xa(f_{o1})}{Xa(f_{o2})}\right|.$$

Of note, this ratio value is not affected by any spectral aliasing, and may be provided to a downstream fly height calculation circuit 290 or other recipient depending upon the system in which compensation circuit 200 is implemented. Fly height calculation circuit may be any fly height calculation circuit known in the art that is capable of determining fly height based upon a harmonic ratio. Based upon the disclosure provided herein, one of ordinary skill in the art will recognize various fly height calculation circuits that may utilize the information provided by compensation circuit 200. Yet further, based upon the disclosure provided herein, one of ordinary skill in the art will recognize that the first frequency $f_{o1}$ can be chosen to be any harmonic frequency (not equal to $f_{o2}$) at which the spectrum $Xd(f_{o1})$ does not suffer aliasing.

It should be noted that while compensation circuit is described in relation to a read channel circuit with an analog front end, that the approach implemented by the circuit may be applied to a number of different scenarios where an analog input signal is converted to a series of digital samples and there is a desire to remove resulting spectral aliasing. Thus, the analog front end circuit may be any circuit capable of providing an analog signal, and read channel analog to digital converter circuit 210 and analog to digital converter circuit 220 may be any analog to digital converter circuits known in the art.

Figure 3:
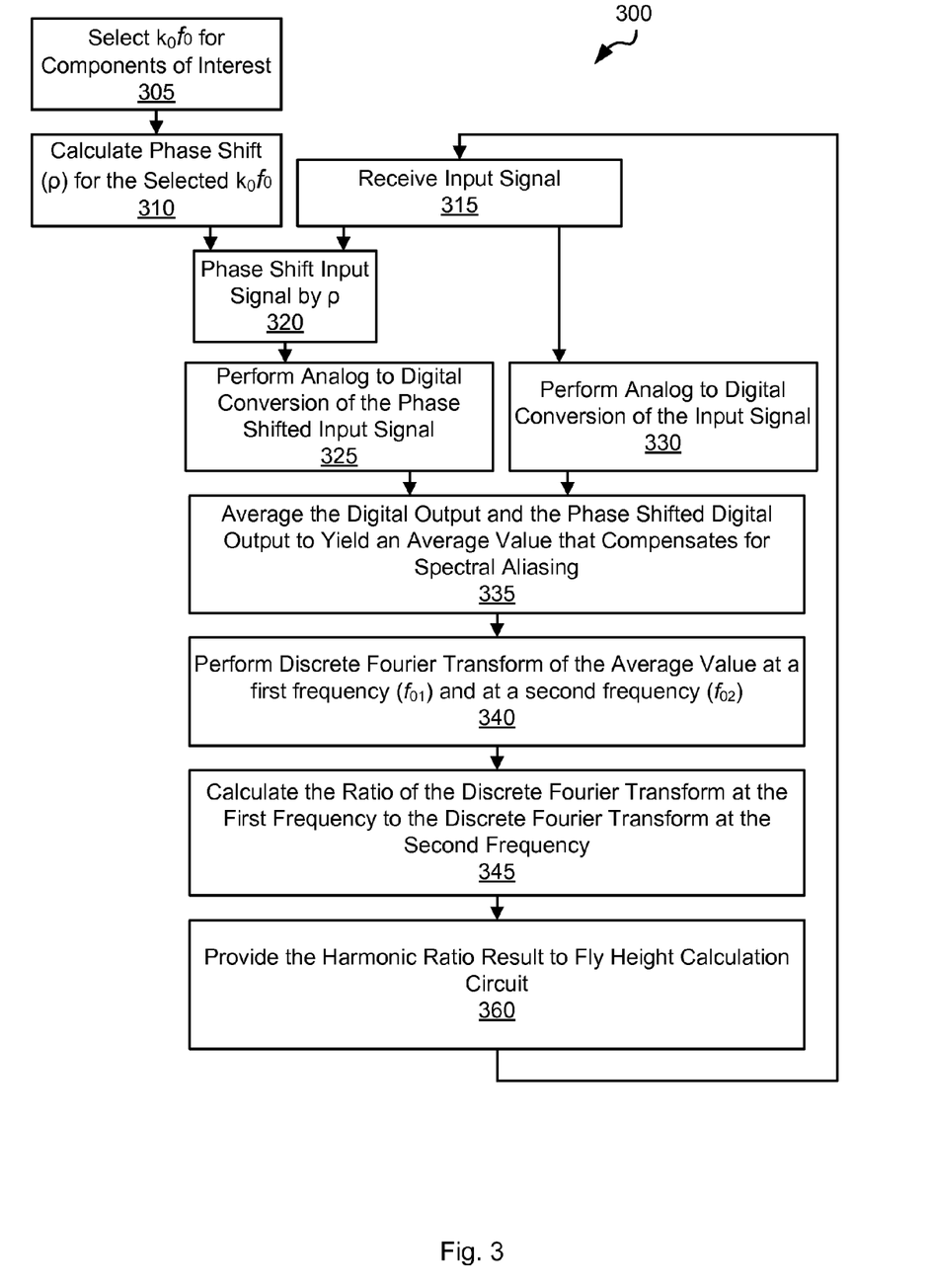
FIG. 3 is a flow diagram depicting a method in accordance with some embodiments of the present invention for phase offset based spectral aliasing compensation.

Turning to FIG. 3, a flow diagram 300 depicts a method in accordance with some embodiments of the present invention for phase offset based spectral aliasing compensation. Following flow diagram 300, a frequency ($k_0 f_0$) for the component of interest is selected (block 305), and based in part thereon, a phase shift value ($\rho$) is calculated (block 310) in accordance with the following equation:

$$\rho = \frac{1}{2[k_0 f_0 - 1/T]}.$$

The aforementioned phase shift value is designed such that an undesired spectral aliasing portion of a phase offset sample set cancels an undesired spectral aliasing portion of a non-phase offset sample set.

A periodic analog input signal (x(t)) is received (block 315). The analog input signal may be received from an analog front end circuit associated with a storage system, or some other source of analog signal massaging. A phase shift ($\rho$) is applied to the received analog input signal (block 320) to yield a phase shifted analog signal (y(t)) represented by the following equation:

$$y(t) = x(t + \rho).$$

An analog to digital conversion is applied to phase shifted analog signal to yield a series of digital samples (y[n]) using a sampling clock operating at a frequency (1/T) provided by sampling clock (block 325). Similarly, an analog to digital conversion is applied to the received analog input signal (x(t)) to yield a series of digital samples (x[n]) using a sampling clock operating at a frequency (1/T) provided by sampling clock (block 330).

The respective series of digital samples are averaged together (block 335) on a sample by sample basis to yield an average value in accordance with the following equation:

$$z[n] = \frac{x[n] + y[n]}{2}.$$

A discrete Fourier transform of the aforementioned average value is performed at two distinct harmonic frequencies of interest ($f_{o1}$ and $f_{o2}$) (block 340) where $f_{o2} = k_0 f_0$ and $f_{o1}$ is such that the spectrum of x[n] does not suffer from aliasing at $f_{01}$ with $f_0$ being the fundamental frequency of the periodic signal x(t). In one particular embodiment of the present invention, the analog periodic signal x(t) has period 8T (i.e. period=8/fs), the first harmonic frequency $f_{01}$ is one eighth of the sampling frequency used by the analog to digital conversion processes of blocks 325, 330. Based upon the disclosure provided herein, one of ordinary skill in the art will recognize other combinations of harmonic frequencies that may be used in relation to different embodiments of the present invention.

The spectrum (discrete Fourier transform) of the sampled sequence (y[n]=y(nT+τ+ρ)) is represented by the following equation where 1/T is the sampling rate used in the synchronous sampling of y(t):

$$Yd(f) = \frac{\exp(2j\pi f[\tau + \rho])}{T} Xa(f) + \frac{\exp(2j\pi[f - 1/T][\tau + \rho])}{T} Xa(f - 1/T) \text{ for } 0 \leq f \leq \frac{1}{2T}.$$

The first portion of the aforementioned equation $$\left(i.e., \frac{\exp(2j\pi f[\tau + \rho])}{T} Xa(f)\right)$$

represents the desired spectrum, and the second portion $$\left(i.e., \frac{\exp(2j\pi[f - 1/T][\tau + \rho])}{T} Xa(f - 1/T)\right)$$

represents the undesired spectral aliasing portion. Yd(f) represents the Fourier transform of y[n] and Xa(f) represents the Fourier transform of x(t). Further, it is assumed that Xa(f) is equal to zero for frequencies beyond |f|=1/T.

Similarly, the spectrum (discrete Fourier transform) of sampled sequence x[n]=x(nT+τ) is represented by the following equation where 1/T is the sampling rate used in the synchronous sampling of x(t):

$$Xd(f) = \frac{\exp(2j\pi f\tau)}{T} Xa(f) + \frac{\exp(2j\pi[f - 1/T]\tau)}{T} Xa(f - 1/T),$$

for $$0 \leq f \leq \frac{1}{2T}.$$

The first portion of the aforementioned equation $$\left(i.e., \frac{\exp(2j\pi f\tau)}{T} Xa(f)\right)$$

represents the desired spectrum, and the second portion represents the $$\left(i.e., \frac{\exp(2j\pi[f - 1/T]\tau)}{T} Xa(f - 1/T)\right)$$

undesired spectral aliasing portion. Xd(f) represents the Fourier transform of x[n].

The aforementioned averaging eliminates the spectral aliasing in the signal at frequency $k_0 f_0$ where ρ is selected such that it is equal to:

$$\rho = \frac{1}{2[k_0 f_0 - 1/T]},$$

as the spectral aliasing components of the phase shifted signal negates the spectral aliasing component of the non-phase shifted signal. Thus, the spectra of the average at the harmonic frequencies $f_{01}$ and $f_{02}=k_0 f_0$ are set forth by the following equation:

$$Zd(f) = \left[\frac{\exp(2j\pi f\tau) + \exp(2j\pi f[\tau + \rho])}{2T}\right] Xa(f)$$

where f∈{$f_{01}$, $f_{02}$}.

A ratio of the first discrete Fourier transform corresponding to the first harmonic frequency $f_{01}$ (i.e. $Zd(f_{01})$) and the second discrete Fourier transform corresponding to the second harmonic frequency $f_{02}$ (i.e. $Zd(f_{02})$) is calculated (block 345) from the average signal z[n]. This computed harmonic ratio, Zd(fo1)/Zd(f02), is consistent with the following equations:

$$\text{harmonic ratio} = \frac{\left[\frac{\exp(2j\pi f_{01}\tau) + \exp(2j\pi f_{01}[\tau + \rho])}{2T}\right] \cdot Xa(f_{01})}{\left[\frac{\exp(2j\pi f_{02}\tau) + \exp(2j\pi f_{02}[\tau + \rho])}{2T}\right] \cdot Xa(f_{02})},$$

or $$|\text{harmonic ratio}| = \left|\frac{1 + \exp(2jf_{01}\rho)}{1 + \exp(2jf_{02}\rho)}\right| \cdot \left|\frac{Xa(f_{01})}{Xa(f_{02})}\right|.$$

The ratio $$\left|\frac{1 + \exp(2jf_{01}\rho)}{1 + \exp(2jf_{02}\rho)}\right|$$

is a known constant. Thus, the harmonic ratio may be reduced to the following equation:

$$|\text{harmonic ratio}| = K \frac{Xa(f_{01})}{Xa(f_{02})}.$$

Of note, this ratio value is not affected by any spectral aliasing, and may be provided to a downstream fly height calculation circuit (block 360) or other recipient depending upon the system in which the method is employed. Based upon the disclosure provided herein, one of ordinary skill in the art will recognize that the first frequency $f_{01}$ can be chosen to be any harmonic frequency (not equal to $f_{02}$) at which the spectrum $Xd(f_{01})$ does not suffer aliasing.

Figure 4A:
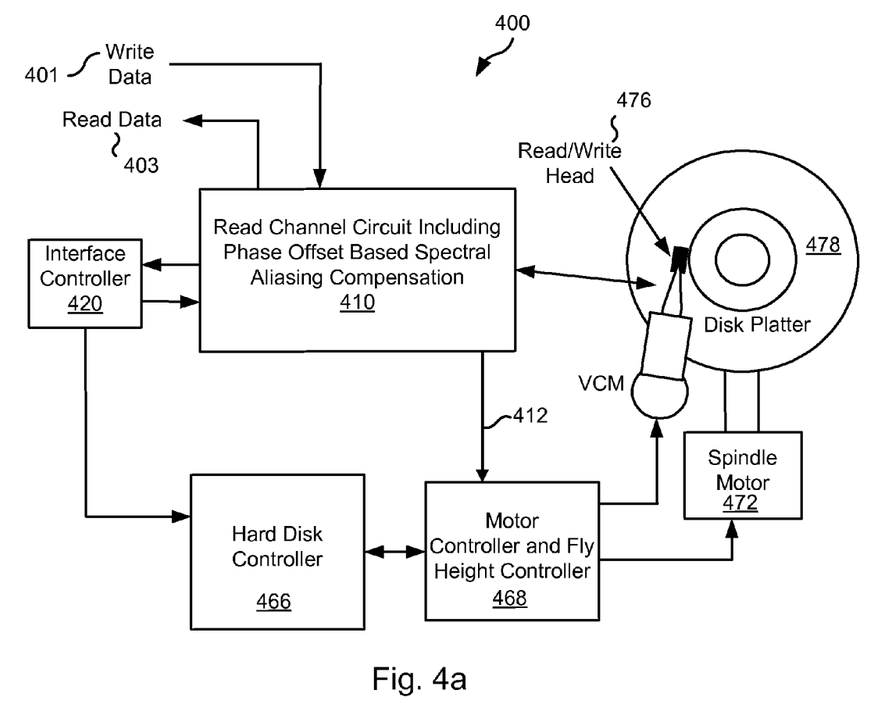
FIG. 4a depicts a storage device including a read channel including phase offset based spectral aliasing compensation in accordance with one or more embodiments of the present invention.

Turning to FIG. 4*a*, a storage device 400 including a read channel circuit 410 including phase offset based spectral aliasing compensation is shown in accordance with one or more embodiments of the present invention. Storage device 400 may be, for example, a hard disk drive. Read channel circuit 410 includes phase offset based spectral aliasing compensation that may be implemented consistent with that discussed in relation to FIG. 2 above, and/or may operate consistent with the methods discussed above in relation to FIG. 3. Further, read channel circuit 410 may include a data detector, such as, for example, a Viterbi algorithm data detector, and/or a data decoder circuit, such as, for example, a low density parity check decoder circuit. In addition to read channel circuit 410, storage device 400 includes a read/write head assembly 476 disposed in relation to a disk platter 478. Read/write head assembly 476 is operable to sense information stored on disk platter 478 and to provide a corresponding electrical signal to read channel circuit 410

Storage device 400 also includes an interface controller 420, a hard disk controller 466, a motor controller and fly height controller 468, and a spindle motor 472. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with a perpendicular recording scheme. In other embodiments of the present invention, disk platter 478 includes magnetic signals recorded in accordance with a longitudinal recording scheme. Motor controller and fly height controller 468 controls the spin rate of disk platter 478 and the location of read/write head assembly 476 in relation to disk platter 478.

Figure 4B:
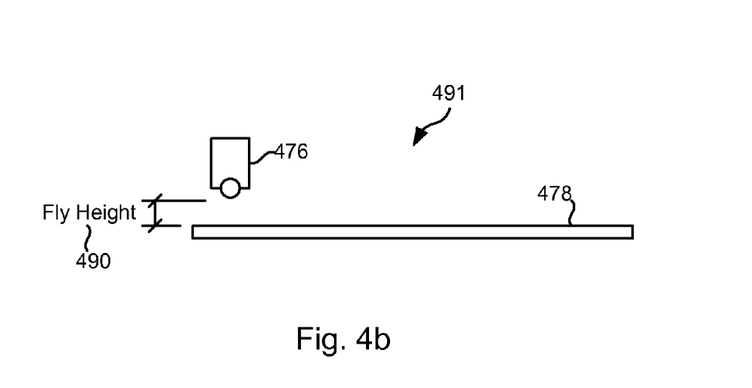

As shown in a cross sectional diagram 491 of FIG. 4b, the distance between read/write head assembly 476 and disk platter 478 is a fly height 490. Fly height 490 is controlled by motor controller and fly height controller 468 based upon a harmonics value 412 provided by read channel circuit 410. The accuracy of harmonics value 412 is improved by the phase offset based spectral aliasing compensation applied by read channel circuit 410.

In a typical read operation, read/write head assembly 476 is accurately positioned by motor controller and fly height controller 468 over a desired data track on disk platter 478. Motor controller and fly height controller 468 both positions read/write head assembly 476 in relation to disk platter 478 (laterally and vertically) and drives spindle motor 472 by moving read/write head assembly 476 to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is provided by read/write head assembly 476 to read channel circuit 410. In turn, read channel circuit 410 decodes and digitizes the received analog signal to recreate the information originally written to disk platter 478. This data is provided as read data 403 to a receiving circuit. A write operation is substantially the opposite of the preceding read operation with write data 401 being provided to read channel circuit 410. This data is then encoded and written to disk platter 478.

At times, a signal derived from disk platter 478 and/or internally generated by read channel circuit 410 may be processed to determine a harmonics value relevant to fly height. This processing includes applying a phase offset to the signal and comparing it with the non-phase offset signal to yield the harmonics value. In some embodiments of the present invention, determining the harmonics value may be done consistent with the methods discussed above in relation to FIG. 3. In various cases, a circuit consistent with that discussed in relation to FIG. 2 above may be used. In various cases, fly height is re-evaluated when a change in operational status of storage device 400 is detected. Such an operational change may include, but is not limited to, a change in an operational voltage level, a change in an operational temperature, a change in altitude, or a change in bit error rate. Based upon the disclosure provided herein, one of ordinary skill in the art will recognize a variety of operational status that may be monitored in storage device 400, and how changes in such status may be utilized to trigger a re-evaluation of fly height.

In conclusion, the invention provides novel systems, devices, methods and arrangements for measuring harmonics. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A circuit for spectral aliasing reduction, the circuit comprising:
a phase shift circuit operable to phase shift an analog input signal and to provide a phase shifted analog signal;
a first analog to digital converter circuit operable to provide a first series of digital samples corresponding to the analog input signal at a sampling frequency;
a second analog to digital converter circuit operable to directly sample the phase shifted analog signal at the sampling frequency to yield a second series of digital samples; and
an averaging circuit operable to average the first series of digital samples with the second series of digital samples to yield an average output.

2. The circuit of claim 1, wherein an amount of phase shift applied by the phase shift circuit is calculated to mitigate spectral aliasing at a particular frequency.

3. The circuit of claim 2, wherein the amount of phase shift is pre-determined for a particular frequency.

4. The circuit of claim 3, wherein the amount of phase shift is calculated in accordance with the following equation:

$$\frac{1}{2[f - 1/T]},$$

wherein f is the particular frequency, and T denotes a period corresponding to the sampling frequency.

5. The circuit of claim 1, wherein the amount of phase shift applied by the phase shift circuit is calculated to eliminate spectral aliasing at a particular frequency.

6. The circuit of claim 1, wherein the averaging circuit adds the first series of digital samples to the second series of digital samples.

7. The circuit of claim 6, wherein the adding the first series of digital samples to the second series of digital samples is done on a sample by sample basis.

8. The circuit of claim 1, wherein the circuit further comprises:
a harmonic sensing circuit operable to divide a first harmonic of the average output by a second harmonic of the average output to yield a harmonic ratio.

9. The circuit of claim 8, wherein the harmonic ratio is provided to a fly height calculation circuit.

10. The circuit of claim 8, wherein the first harmonic corresponds to one eighth of the sampling frequency, and the second harmonic corresponds to three eighths of the sampling frequency.

11. A method for mitigating spectral aliasing, the method comprising:
   receiving an analog input signal;
   phase shifting the analog input signal to yield a phase shifted analog signal;
   performing an analog to digital conversion on the phase shifted analog signal at a sampling frequency to yield a first series of digital samples;
   performing an analog to digital conversion on the analog input signal at the sampling frequency to yield a second series of digital samples; and
   averaging the first series of digital samples and the second series of digital samples to yield an average value.

12. The method of claim 11, wherein an amount of phase shift applied by the phase shift circuit is calculated to mitigate spectral aliasing.

13. The method of claim 11, wherein an amount of phase shift applied by the phase shift circuit is pre-determined for a particular frequency.

14. The method of claim 11, wherein the averaging circuit adds the first series of digital samples to the second series of digital samples on a sample by sample basis.

15. The method of claim 11, wherein the method further comprises:
   performing a discrete Fourier transform of the average value at a first harmonic frequency to yield a first output; and
   performing a discrete Fourier transform of the average value at a second harmonic frequency to yield a second output.

16. The method of claim 15, wherein the method further comprises:
   calculating a ratio of the first output to the second output to yield a harmonic ratio.

17. The method of claim 15, wherein the first harmonic frequency corresponds to one eighth of the sampling frequency, and the second harmonic frequency corresponds to three eighths of the sampling frequency.

18. A storage system, the system comprising:
   a storage medium;
   a read/write head assembly disposed a fly height from the storage medium and operable to sense information maintained on the storage medium and to provide an analog input signal corresponding to the sensed information;
   a read channel circuit, wherein the read channel circuit includes:
   a phase shift circuit operable to phase shift the analog input signal and to provide a phase shifted analog signal;
   a first analog to digital converter circuit operable to provide a first series of digital samples corresponding to the analog input signal at a sampling frequency;
   a second analog to digital converter circuit operable to provide a second series of digital samples corresponding to the phase shifted analog signal at the sampling frequency;
   an averaging circuit operable to average the first series of digital samples with the second series of digital samples to yield an average output;
   a harmonic sensing circuit operable to divide a first harmonic of the average output by a second harmonic of the average output to yield a harmonic ratio; and
   a fly height adjustment circuit operable to receive the harmonic ratio and to adjust the fly height based upon the harmonic ratio.

19. The system of claim 18, wherein an amount of phase shift applied by the phase shift circuit is predetermined to mitigate spectral aliasing at a particular frequency when the analog input signal is sampled at the sampling frequency.

20. The system of claim 18, wherein the averaging circuit adds the first series of digital samples to the second series of digital samples on a sample by sample basis.

21. A system for spectral aliasing reduction, the system comprising:
   a clock recovery circuit operable to provide a clock operating at a sample frequency;
   a phase shift circuit operable to apply a phase shift to an input to yield a phase shifted input;
   an analog to digital conversion circuit operable to:
   convert the input to a first series of digital samples synchronous to the clock; and
   sample the phase shifted input to yield a second series of digital samples synchronous to the clock; and
   an averaging circuit operable to average the first series of digital samples with the second series of digital samples to yield an average output.

22. The system of claim 21, wherein the analog to digital conversion circuit comprises:
   a first analog to digital converter circuit operable to convert the input to a first series of digital samples; and
   a second analog to digital converter circuit operable to convert the phase shifted input to a second series of digital samples.

23. The system of claim 21, wherein an amount of phase shift applied by the phase shift circuit is pre-determined for a particular frequency.

24. The system of claim 23, wherein the amount of phase shift is operable to eliminate spectral aliasing at the particular frequency.

25. The system of claim 21, wherein the averaging circuit adds the first series of digital samples to the second series of digital samples on a sample by sample basis.

26. The system of claim 21, wherein the system further comprises:
   a harmonic sensing circuit operable to divide a first harmonic of the average output by a second harmonic of the average output to yield a harmonic ratio.

27. The system of claim 26, wherein the harmonic ratio is provided to a fly height calculation circuit.

28. The system of claim 26, wherein the first harmonic corresponds to one eighth of the sampling frequency, and the second harmonic corresponds to three eighths of the sampling frequency.

29. The system of claim 21, wherein the system is implemented as part of an electronic device selected from a group consisting of: a storage device, and a data transfer device.

30. The system of claim 21, wherein the system is implemented as part of an integrated circuit.

* * * * *